United States Patent Office 2,984,583
Patented May 16, 1961

2,984,583
PROCESS FOR THE COATING OF SURFACES AND OBJECTS

Rudolf Nagelschmidt, Hanau (Main), Germany, assignor to Deutsche Gold- und Silber-Scheideanstalt vormals Roessler, Frankfurt am Main, Germany No Drawing. Filed Oct. 7, 1957, Ser. No. 688,396
Claims priority, application Germany Oct. 5, 1956
18 Claims. (Cl. 117—72)

The present invention relates to an improved process for the coating of surfaces or objects of all types, such as, wood, concrete, masonry, metals, plastics and the like as well as the coating or impregnation of textiles and other fibrous products, with polyvinyl chloride-polychlorobutadiene containing coatings.

Polyvinyl chloride coatings (of the most varied types) which are distinguished by their excellent properties are already known. It is also known that polychlorobutadiene can be employed for the same purpose. Previously, however, it has not been possible to unite these two substances with the aid of a solvent as they mutually precipitate each other and are not compatible with each other in solution. While it has been proposed to unite polyvinyl chloride and polychlorobutadiene (Neoprene) into a mutual coating by a hot spraying process, this process, aside from requiring complicated apparatus, does not permit simultaneous use of vulcanizing agents causing a cold vulcanization effecting cross linking of the components of the coatings.

According to the invention it was unexpectedly found that it is possible to dissolve mixtures of polyvinyl chloride and polychlorobutadiene in solvents or solvent mixtures without causing mutual precipitation if the polyvinyl chloride and polychlorobutadiene mixtures are masticated with each other prior to such solution. The resulting solutions can be applied to the objects or surfaces to be coated or impregnated, by spraying, painting, dipping, rolling-on, and the like.

Coatings obtained with the solutions according to the invention possess an especially high resistance to corrosion, erosion and abrasion and furthermore are resistant to attack by oil and other chemicals. As a rule, they are elastic but their hardness and flexibility can be varied as desired by the addition of other materials.

It was found especially advantageous to employ mixtures of crystallizable and non-crystallizable polychlorobutadiene as the polychlorobutadiene component. The mastication of the polychlorobutadiene and polyvinyl chloride expediently is carried out in known apparatus producing high shearing forces. For example, the mastication can be carried out with rollers, particularly those rotating at different relative velocities or in Banbury mixers. The mastication can be carried out at room temperatures but in some instances it may be expedient to employ heated apparatus.

While the invention is not limited to any particular polychlorobutadiene and polyvinyl chloride proportions, it has been found expedient, for some purposes, to employ mixtures of 95 to 50%, of polychlorobutadiene and 5 to 50% of polyvinyl chloride.

Fillers can also be added to compositions according to the invention depending upon the intended use. The so-called active reenforcing fillers which when added to rubber have a strengthening effect have proved especially suited as fillers according to the invention. Examples of such active reenforcing fillers for instance are carbon black and extremely finely divided metal or metalloid oxides such as, aluminum oxide, titanium oxide, zirconium oxide or silicon dioxide, which are produced by vapor phase reactions of volatile compounds of the corresponding metals or metalloids at elevated temperatures under oxidizing or hydrolyzing conditions. Such oxides for example can be produced by supplying the corresponding chloride vapors to a highly heated reaction zone, for example, 800° C. and above, containing oxygen and/or water vapor. Expediently such oxides are produced by the well known process in which the vaporized chlorides are supplied to a combustion zone provided by the combustion of a combustible gas mixture containing a combustible hydrogen containing gas, such as, hydrogen or methane, the combustion of which not only supplies the heat for the reaction but also water vapor to provide hydrolytic conditions.

The addition of active reenforcing fillers to the compositions according to the invention will, for example, improve the tensile strength of the polychlorobutadiene-polyvinyl chlorides mixtures threefold. The quantity of such fillers employed can vary within wide limits. They can be added to the finished solutions or during the mastication if better distribution is desired. In many cases, it is expedient to add 50 to 150 parts of filler for every 100 parts of polychlorobutadiene polyvinyl chloride mixtures.

When the mixtures are to be employed as a putty or a spachteling compound the quantity of filler added should be sufficient to provide the proper stiff consistency.

While the finely divided fillers, especially the active reenforcing fillers, improve the tensile strength of the composition, it is expedient, in other instances, to employ coarse grain fillers. Mixtures are thus obtained which are suited for the production of anti-slip coatings for floors, steps and the like.

Other materials, especially natural and synthetic resins, chlorinated rubber and after chlorinated polyvinyl chloride, can also be incorporated, as desired, in the polychlorobutadiene polyvinyl chloride mixtures according to the invention. Plasticizers or plasticizing polymers can also be incorporated therein in order to obtain softer mixtures. The addition of these materials can be either to the solution or during the mastication.

An especial advantage of the mixtures according to the invention is that they can be vulcanized so that a further improvement in their mechanical properties can be attained. Naturally the vulcanizing agents can only be added shortly before use of the solutions according to the invention.

Reaction products of polyamines, preferably those with 2 to 8 carbon atoms, with aliphatic ketones are especially good vulcanizing agents for the compositions according to the invention. Good vulcanizing agents are obtained by reacting polyamines with cycloaliphatic ketones such as cyclohexanone. The amine-ketone reaction product vulcanizing agents can, for example, be prepared by reacting the amine with the ketone, preferably, an excess of the latter, in the presence of a metal oxide such as zinc oxide or zirconium oxide. The crude solutions thus obtained can be employed directly as the vulcanizing agents.

The application of the coatings according to the invention can be effected in most varied ways. Often it is expedient to apply a primer to the surface to be coated before application of the polychlorobutadiene-polyvinyl chloride coating. Primers containing chlorinated high molecular weight polymers, especially chlorinated rubber, have been found suitable. Furthermore, primers containing copper oxide or its hydrate and a heterocyclic base, such as pyridine, have been found particularly suited. Such primers adhere particularly firmly upon the base and provide a good bond for the polychlorobutadiene-polyvinyl chloride mixture applied thereover.

Fillers can also be added to the primer material. Such fillers, for example, can be the finely divided metal or metalloid oxides referred to above as fillers for the polychloro-butadiene-polyvinyl chloride mixture.

If necessary, a vulcanizing agent can already be incorporated in the primer.

The coating can, depending upon the requirements, be applied in one or more layers and if desired over a priming coat. It is expedient that the lower layer or lower layers contain a vulcanizing agent and that the upper layer or layers are applied without a vulcanizing agent.

The following examples will serve to illustrate several embodiments of the invention.

*Example I*

55 parts by weight of polychlorobutadiene and 45 parts by weight of polyvinyl chloride were masticated together for fifteen minutes at room temperature in a rolling mill with a friction ratio of 1:12 and with the slower roller revolving at 7 r.p.m. A homogeneous coherent sheet was obtained thereby. The mastication was continued for a further five minutes with repeated removal from the rolls. Thereafter the resulting sheet was cut into small pieces and dissolved in a mixture of 65 parts by weight of mineral spirits.
20 parts by weight of methyl acetate.
65 parts by weight of methyl ethyl ketone.

This solution can be used as such for coating.

*Example II*

A polychlorobutadiene-polyvinyl chloride mixture as in Example I was masticated for 15 minutes as in Example I. Thereupon 100 parts by weight of a fairly divided silica (Aerosil produced by decomposing vaporized silicon tetrachloride in a flame of a hydrogen containing gas and having a particle size below 50mµ) were added to the masticated mixture and the mastication continued for another 5 minutes. The milled mixture was then dissolved in the same solvent as in Example I. A dispersion of 20 parts by weight of finely divided titanium dioxide in 40 parts by weight of methylglycolacetate was prepared separately and then added while stirring to such first prepared mixture. The resultant product was excellently suited for protecting metals and other materials against corrosion.

*Example III*

85 parts by weight of polychlorobutadiene and 15 parts by weight of polyvinylchloride were masticated as in Example I and the resulting mixture dissolved in the same solvent mixture as in Example I. Then 50 parts by weight of carbon black and 5 parts by weight of dioctyl phthalate were triturated with such solution. Coatings produced from the resulting mass exhibit especially good adhesion to metal surfaces.

*Example IV*

75 parts by weight of polychlorobutadiene and 25 parts by weight of polyvinyl chloride were masticated as in Example I. After 15 minutes mastication 30 parts by weight of finely divided mica, and 30 parts of finely divided antimony trioxide were added thereto and the mixture milled until a homogeneous sheet was obtained. This sheet was cut up and dissolved (or respectively suspended) in a solvent mixture of:

| | Parts by weight |
|---|---|
| Trichloroethylene | 40 |
| Methylene chloride | 30 |
| Perchloroethylene | 25 |
| Xylene | 15 |
| Methylethylketone | 40 |

This mass has a high electric resistance and can also be used to protect objects which are particularly exposed to corrosion. The coatings obtained after evaporation of the solvent are non-combustible.

An improved resistance to corrosion can be obtained by adding 5% of a mixture prepared as follows:

50 parts by weight of tetramethylene diamine were mixed with 250 parts by weight of methyl ethyl ketone and 70 parts by weight of zinc oxide and the mixture heated to boiling for four hours. Thereafter the mixture was permitted to cool slowly over a period of 24 hours.

The addition of this mixture causes vulcanization (cross-linking) even at room temperature.

If a better bond to the base is desired it is recommended to apply the polychlorobutadiene-polyvinyl chloride mixture over a priming coating produced from a primer of the following composition:

| | Parts by weight |
|---|---|
| Chlorinated rubber | 15.00 |
| Carbon black | 1.00 |
| Aluminum oxide aerogel | 0.50 |
| Polychlorobutadiene | 1.00 |
| Dibutyl phthalate | 0.50 |
| Copper oxide | 0.75 |
| Pyridine | 0.25 |
| Ethyl acetate | 45.00 |
| Methanol | 4.00 |
| Butyl acetate | 20.00 |
| Methylethyl ketone | 12.00 |

*Example V*

When the polychorobutadiene-polyvinyl chloride, mica and antimony trioxide mixture produced as in Example IV was dissolved in only one-half the quantity of the solvent indicated in Example IV a highly viscous mass was obtained which was excellently suited as a spreadable elastic putty.

*Example VI*

| | Parts by weight |
|---|---|
| Polychorobutadiene | 60 |
| Polyvinyl chloride | 40 |
| Silica aerogel | 15 |
| Antimony trioxide | 10 |
| Iron oxide pigment | 10 | were masticated as described in Example I. The resulting sheet after being cut up was dissolved in 145 parts by weight of the solvent mixture of Example IV and 5 parts by weight of a plasticizing oil having a low aniline point (benzene with an aliphatic side chain of 6 C-atoms) and 20 parts by weight of the vulcanizing agent described in Example IV added thereto. This mass when spread upon a backing web such as cotton drill, produced an artificial leatherlike product which was flame resistant and possessed great resistance against abrasion, oil and chemicals.

Suitable solvents for the masticated mixtures are mixtures of various solvents, such as aromatic hydrocarbons together with aliphatic or aromatic esters, ketones or chlorinated hydrocarbons, or benzene hydrocarbons together with the said esters, ketones or chlorinated hydrocarbons, or mixtures of the said aromatic hydrocarbons and the said benzene hydrocarbons with the said other compounds.

What is claimed is:

1. A process for coating surfaces with a coating comprising polychlorobutadiene and polyvinyl chloride which comprises masticating a mixture of unvulcanized polychlorobutadiene and polyvinyl chloride at approximately room temperature until a homogeneous mixture is obtained, dissolving such masticated mixture in a volatile solvent, applying a coating of such solution to the surface to be coated and permitting the solvent to evaporate.

2. The process of claim 1 in which the polychlorobutadiene component is a mixture of crystallisable and noncrystallisable polychlorobutadiene.

3. The process of claim 1 in which high shearing forces are employed for said mastication.

4. The process of claim 1 in which the mixture contains 95 to 50 parts by weight of polychlorobutadiene and 5 to 50 parts by weight of polyvinyl chloride.

5. The process of claim 1 in which filling materials are incorporated in such coating solution.

6. The process of claim 5 in which said filling material is an active reenforcing filler.

7. The process of claim 5 in which the quantity of filler incorporated is 50 to 150 parts by weight per 100 parts by weight of the polychlorobutadiene-polyvinyl chloride mixture.

8. The process of claim 5 in which a plasticizer is incorporated in said coating solution.

9. The process of claim 1 in which a vulcanizing agent is incorporated in said coating solution.

10. The process of claim 9 in which said vulcanizing agent is a reaction product of a polyamine and an aliphatic ketone.

11. The process of claim 9 in which said vulcanizing agent is the crude solution obtained in a reaction between a polyamine and an aliphatic ketone in the presence of a metal oxide.

12. The process of claim 1 in which said coating is applied over a primer.

13. The process of claim 12 in which said primer contains a chlorinated high molecular weight polymer.

14. The process of claim 12 in which said primer contains a copper compound selected from the group consisting of copper oxide and its hydrate and a heterocyclic base.

15. The process of claim 12 in which said primer contains a filler.

16. The process of claim 12 in which said primer contains aluminum oxide aerogel as a filler.

17. The process of claim 12 in which said primer contains a vulcanizing agent.

18. In a method of producing a coating composition comprising a mixture of unvulcanized polychlorobutadiene and polyvinyl chloride, the steps which comprise masticating a mixture of polychlorobutadiene and polyvinyl chloride at approximately room temperature until a homogeneous mixture is obtained and dissolving said masticated mixture in a volatile solvent for said mixture of polychlorobutadiene and polyvinyl chloride.

References Cited in the file of this patent
UNITED STATES PATENTS

| | | |
|---|---|---|
| 2,278,833 | Crawford | Apr. 7, 1942 |
| 2,658,050 | Signer | Nov. 3, 1953 |
| 2,755,271 | Tawney | July 17, 1956 |
| 2,870,115 | Schroeder | Jan. 20, 1959 |